United States Patent
Simonazzi

(10) Patent No.: US 7,385,487 B2
(45) Date of Patent: Jun. 10, 2008

(54) OBSTACLE DETECTION METHOD AND SYSTEM, PARTICULARLY FOR SYSTEMS FOR ASSISTING THE PARKING OF VEHICLES

(75) Inventor: Giuseppe Simonazzi, Reggio Emilia (IT)

(73) Assignee: Meta System - S.p.A., Reggio Emilia (IT)

( * ) Notice: Subject to any disclaimer, the term of this patent is extended or adjusted under 35 U.S.C. 154(b) by 141 days.

(21) Appl. No.: 11/226,256

(22) Filed: Sep. 15, 2005

(65) Prior Publication Data

US 2006/0087414 A1    Apr. 27, 2006

(30) Foreign Application Priority Data

Sep. 24, 2004    (IT)    .................. MO2004A0244

(51) Int. Cl.
*B60Q 1/00* (2006.01)

(52) U.S. Cl. ...................... 340/435; 340/903; 342/118; 367/99

(58) Field of Classification Search ................ 340/903, 340/435, 904, 932.2, 943, 933, 436; 367/99; 342/118

See application file for complete search history.

(56) References Cited

U.S. PATENT DOCUMENTS

| | | | | |
|---|---|---|---|---|
| 4,551,722 A * | 11/1985 | Tsuda et al. | ................. | 340/904 |
| 5,450,057 A * | 9/1995 | Watanabe | .................... | 340/435 |
| 5,764,136 A * | 6/1998 | Harron | ....................... | 340/435 |
| 6,445,285 B1 * | 9/2002 | Sparling | ..................... | 340/436 |
| 6,594,614 B2 * | 7/2003 | Studt et al. | ................. | 702/150 |
| 6,987,864 B2 * | 1/2006 | Nishigaki et al. | ........... | 382/104 |
| 2003/0122659 A1 * | 7/2003 | Lam | .......................... | 340/435 |
| 2004/0001019 A1 * | 1/2004 | Nakazawa et al. | ............ | 342/70 |

* cited by examiner

*Primary Examiner*—Brent A. Swarthout
(74) *Attorney, Agent, or Firm*—Browdy & Neimark

(57) ABSTRACT

An obstacle detection system, particularly for assisting car parking that comprises a control unit and a plurality of sensors, which comprise emitters-receivers for emitting an ultrasonic signal and for receiving an echo signal reflected by at least one obstacle and an evaluator for the parametric evaluation of the received echo signals, the evaluator comprising a polling module suitable to determine, for each sensing, the number of times for which the received signals are repeated and to reject the signals that are repeated for a number of times that is lower than a preset number.

3 Claims, 3 Drawing Sheets

OBSTACLE DETECTION METHOD AND SYSTEM, PARTICULARLY FOR SYSTEMS FOR ASSISTING THE PARKING OF VEHICLES

The present invention relates to an obstacle detection method and system, particularly for systems designed to facilitate the parking of motor vehicles.

BACKGROUND OF THE INVENTION

During maneuvers for parking a vehicle, it is not possible to perceive exactly the distance between the vehicle and the obstacles that lie in the parking area, particularly during reversing maneuvers or maneuvers for approach on the opposite side with respect to the driver. Moreover, it is not infrequent to find oneself in a condition in which some obstacles are completely concealed and invisible to the driver, as occurs in the case of obstacles located in corners that are covered by the vehicle structure or are very low, for example the typical bollards used to delimit parking areas, or simple poles.

In order to solve the drawback and thus avoid unpleasant accidents, systems are known which are provided with sensors for detecting the distance between the motor vehicle and the surrounding obstacles.

Systems using ultrasonic sensors are mainly used for measuring the distance between an obstacle and a motor vehicle; these sensors detect a signal emitted previously by a radiating element located in the vicinity of the sensor and reflected by an obstacle that lies proximate to the vehicle.

During an adequate time window, the received return signal, known as echo signal, is compared with a threshold value, and if said threshold value is exceeded, the sensor generates a warning signal.

In these systems, it is particularly important to avoid the emission of incorrect warning signals and to increase the precision of the assisted parking system. Incorrect warning signals refer in particular to signals reflected by objects that do not constitute a danger of collision with the vehicle, such as for example the ground, the optional towing hook mounted on the vehicle, particularly distant obstacles, or signals caused by noise.

For this purpose, currently it is known to adjust the time window so as to exclude from the comparison with the threshold values the signals caused by particularly distant obstacles. The duration of the time window in fact determines the monitoring depth of the system.

As an alternative, it is common to vary the duration of the signals emitted by the radiating element of the sensor or to vary the power radiated by said signals.

Finally, it is also known to act on the threshold values, which can vary according to time. Generally, the threshold values are reduced monotonically over time until the end of the time window, in order to prevent the system from generating warning signals caused by extremely proximate signals produced by the reflection of the ultrasound for example against the ground or against the towing hook.

Other known systems adapt the threshold values to the physical parameters of the car in order to further increase the precision of the system. Moreover, these threshold values are changed dynamically also according to the direction of travel of the vehicle, so as to increase the sensitivity of the sensors located in the direction of travel and reduce the sensitivity of the remaining ones.

The need to detect the various obstacles that are present around the vehicle and to take into account the various factors described above in order to provide increasingly accurate information is a requirement that still stands despite the existing solutions.

In particular, one of the problems that most significantly affect the sensing devices of the background art is reliability, i.e., the assurance that the warning signals are emitted exclusively at an obstacle. For this purpose, it is necessary to avoid the emission of incorrect warning signals caused by noise, which may confuse the driver, and therefore increase the precision and reliability of the system.

SUMMARY OF THE INVENTION

The aim of the present invention is to eliminate the drawbacks mentioned above in known types of obstacle detection system, by providing an obstacle detection system that minimizes the emission of incorrect warning signals and thus increases the precision of said system.

Within this aim, an object of the present invention is to provide an obstacle detection system that is capable of adapting the sensitivity of the sensors to physical and environmental parameters and to the arrangement of the obstacles.

Another object of the present invention is to provide an obstacle detection system that is more flexible and optimized.

Another object of the present invention is to provide an obstacle detection system that requires a reduced number of electronic components for its operation.

This aim and these and other objects, which will become better apparent from the description that follows, are achieved by an obstacle detection system, which comprises a control unit and a plurality of sensors, said sensors comprising means for emitting an ultrasonic signal and for receiving an echo signal reflected by at least one obstacle and means for the parametric evaluation of received echo signals, characterized in that the means for parametric evaluation comprise means suitable to determine, for each sensing, the number of times for which the received signals are repeated and to reject the signals that are repeated for a number of times that is lower than a preset number.

Conveniently, the parametric evaluation means further comprise means suitable to drive the power radiated by the signal emission means and means suitable to compare the signals received by the echo signal receiving means with threshold values.

The proposed aim and objects are also achieved by an obstacle detection method, which comprises the steps of determining, for each sensor that belongs to the activation cycle, the power to be radiated, emitting the corresponding ultrasonic signals, and receiving the echo signals reflected by at least one obstacle; determining, on the basis of the received echo signals, the distances of the corresponding sensors from the obstacle and amplifying the received echo signals according to their corresponding distances; selecting the threshold values with which the amplified signals according to the determined distances are to be compared; and is characterized in that it comprises the step of determining, for each sensing cycle, the number of times for which the signals that exceed the respective selected threshold values are repeated and, if said number is greater than a preset value, generating a warning signal.

Conveniently, the obstacle detection method further comprises the steps of: determining the order of priority of the individual sensors according to the calculated distances; determining the activation sequence of the sensors according to the determined order of priority; and adapting the sensor activation cycle according to the determined activation sequence.

BRIEF DESCRIPTION OF THE DRAWINGS

Further characteristics and advantages of the invention will become better apparent from the following detailed description of a preferred but not exclusive embodiment of the obstacle detection system, illustrated by way of non-limiting example in the accompanying drawings, wherein.

DESCRIPTION OF THE PREFERRED EMBODIMENTS

Figure 1:
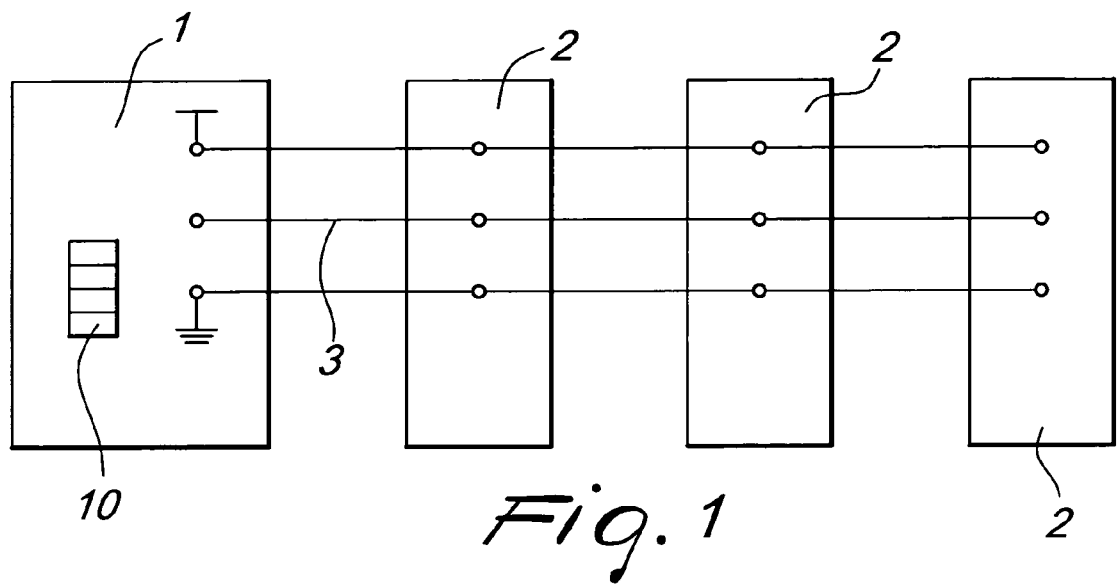
FIG. 1 is a schematic view of the architecture of the system according to the invention.
Figure 2:
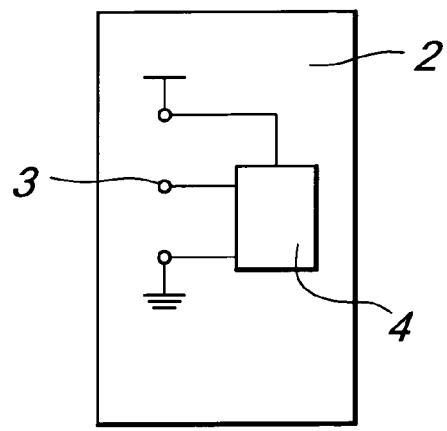
FIG. 2 is a more detailed diagram of the sensors of FIG. 1.
Figure 3:
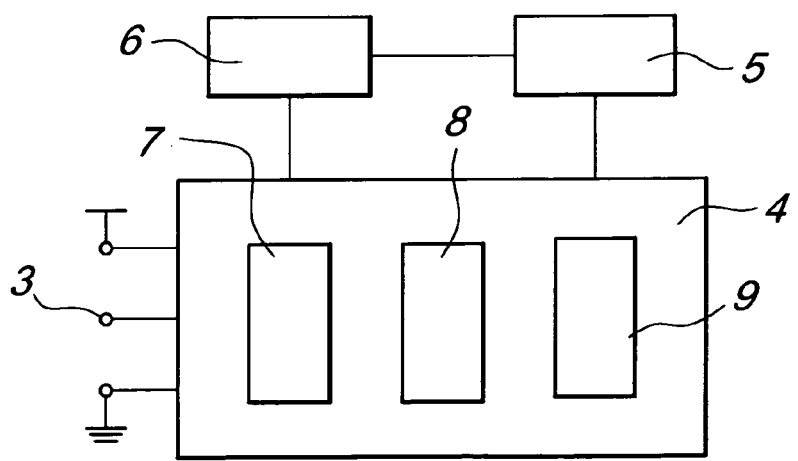
FIG. 3 is a block diagram of the sensor used in the system according to the invention.

As shown schematically in FIG. 1, the obstacle detection system comprises a control unit 1, which is suitable to manage a variable number of sensors 2 connected to the control unit 1 by means of at least one bus 3 and comprises memory means 10. The control unit 1 may optionally be integrated in devices that already exist within the motor vehicle and are connected to the internal network, typically of the CAN type, of the car.

The sensors 2 comprise parametric evaluation means, such as a microcontroller 4 for driving signal emission means and such signal emission means formed by a transducer 5 capable of emitting and receiving ultrasound.

For this purpose, the microcontroller 4 comprises power driving means, such as a module 7 for driving the power of the signal radiated by the signal emission means, such as the transducer 5 by varying the number of pulses sent to the transducer 5 and the supply voltage. Moreover, the transducer receives from the microcontroller 4 a signal which determines the time window for listening for the echo signal.

In order to emit the ultrasound signal, the supply voltage reaches the transducer 5 across a transformer 6, which raises in its peak-to-peak value according to the driving of the microcontroller 4.

Further, the microcontroller 4 comprises comparison means, such as a module 8 for comparing the reflected signal with dynamically optimized threshold values. The module 8 further amplifies adequately the received echo signal before performing the comparison.

Moreover, the microcontroller 4 comprises polling means, such as a filter module 9, which is suitable to eliminate echo signals detected in succession a number of times that is smaller than a preset threshold. The filter module 9 recognizes false reports, caused for example by noise, on the basis of the number of repeated sensings; only echo signals that are repeated for a sufficient number of times are interpreted as signals that indicate obstacles and are then subjected to comparison by means of the comparison module 8.

The modules 7, 8, 9 are configured in order to optimize the coverage of the space that they face and also to avoid detecting echoes generated by fixed obstacles, such as for example the towing hook. For this purpose, the monitored space is divided into reading regions, for which specific values of the configuration parameters of the modules 7, 8, 9 are defined. These parameters take into account several factors, such as for example environmental factors, the distance of the obstacles from the vehicle and their spatial arrangement, and are optimized dynamically according to the previously measured values.

The obstacle detection system operates as follows.

Figure 4:
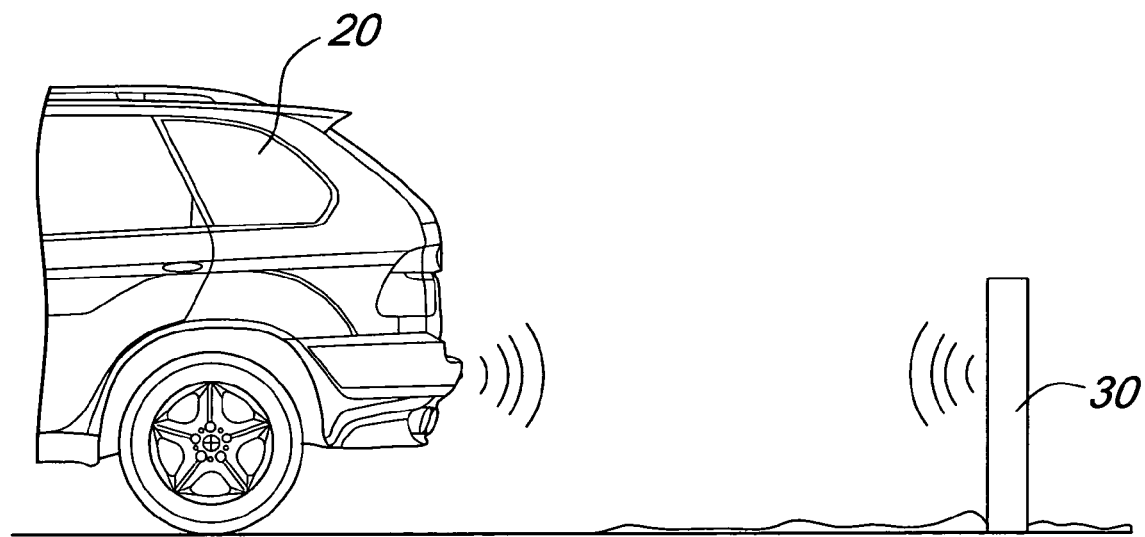
FIG. 4 is a schematic view of a scenario in which a sensor detects an obstacle.
Figure 5:
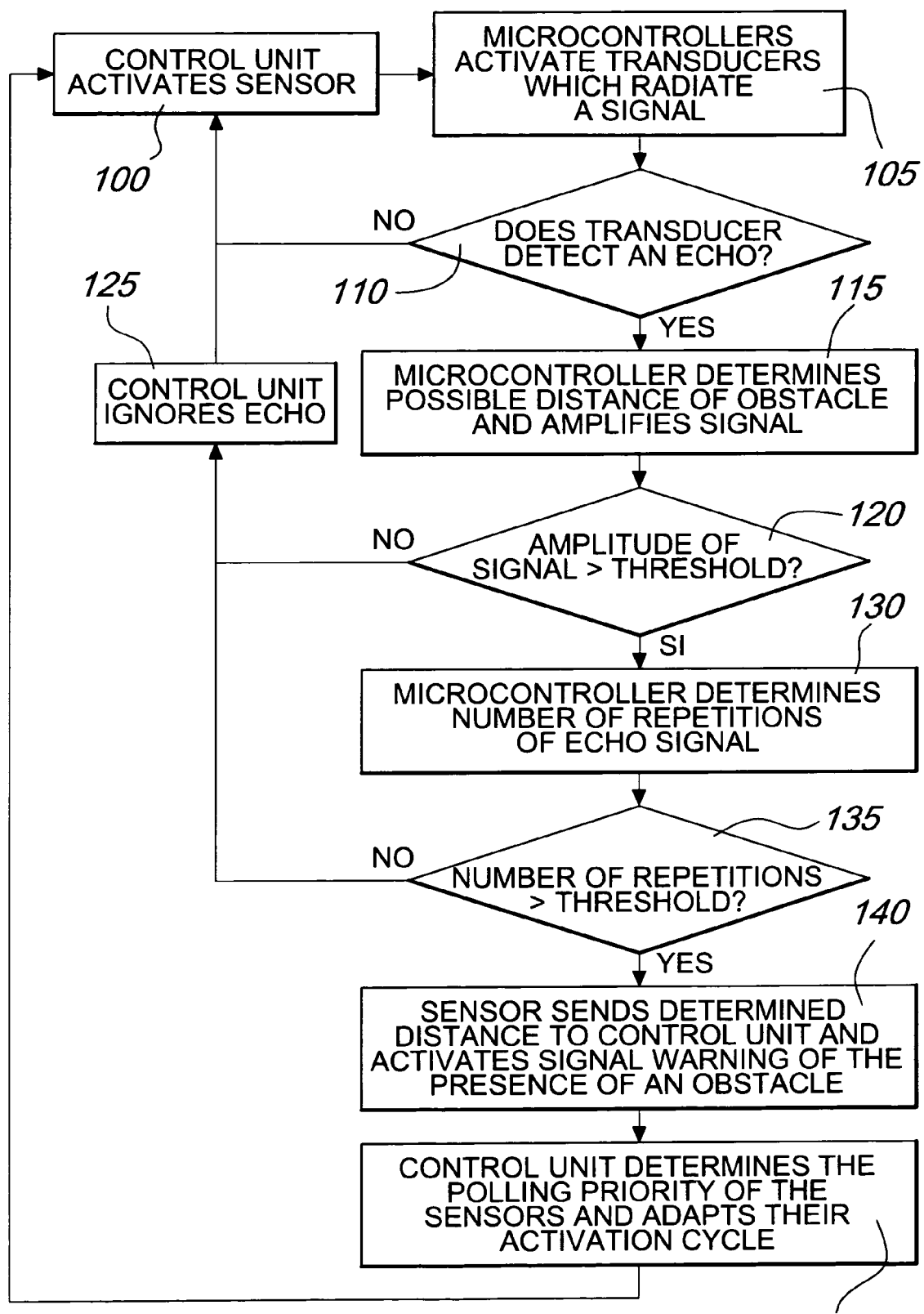
FIG. 5 is a block diagram of the management of each individual sensor.

When the system is activated (step 100 of FIG. 5), the control unit 1 sends selectively an activation pulse to the sensors 2, which start to emit ultrasound signals. During the movement of the vehicle 20 toward any obstacles 30, said obstacles are struck by the waves radiated by the sensors and reflect them, generating an echo, which is received by the sensors 2, as shown schematically in FIG. 4.

In detail, in step 105 the microcontroller 4 determines the power to be radiated on the basis of the preceding sensings, acting on the supply voltage in input to the transformer 6. Depending on said supply voltage, the transducer 5 emits ultrasound signals and, in the presence of obstacles 30, receives their reflected signals, i.e., an echo signal.

If no echo signal is received, the sensing process restarts from step 100, in which the control unit 1 sends the activation signal cyclically to the sensors 2.

If instead there is an echo signal, in step 115 the microprocessor 4 of the sensor 2 that detects it determines the possible distance of the obstacle 30 and amplifies the signal adequately according, among other factors, to the determined distance.

Depending on the calculated distance, the microcontroller 4 further selects the threshold value with which the amplified signal is to be compared. The amplified signal and the adequate threshold value are compared in step 120. If the amplitude of the signal does not exceed the threshold value, the echo signal is ignored (step 125) and the process restarts from step 100, in which the control unit 1 sends an activation pulse to the sensor 2.

If instead the amplitude of the signal exceeds the threshold value, the microcontroller 4 compares, in step 130, the received signal with the signals received in preceding cycles and counts the number of times for which said signal is repeated. If said number of repetitions exceeds a threshold value of the number of cycles (step 135), the sensor 2 sends the calculated distance to the control unit 1. The control unit 1 thus activates the signal that warns of the presence of an obstacle 30 and stores in the memory means 10 the value that corresponds to the calculated distance, associating it with the sensor 2 from which it arrives. The warning signal may optionally vary according to the distance value sent to the control unit 1.

In a negative case, instead, the echo signal is ignored (step 125) and the cycle restarts from step 100 for activating the sensors 2.

Depending on the values of the distance of the obstacles 30 from the individual sensors 2 received by the control unit 1, the control unit 1 determines, in step 145, the priority of the individual sensors 2, determining a sequence for polling the sensors 2, and adapts the activation cycle accordingly.

Polling priority is based on the distance detected after the scanning of each sensor 2. The distances stored in the memory means 10 are used initially to determine which sensor 2 is detecting the closest obstacle 30. The value of the distance that corresponds to the minimum determined distance receives the addition of a priority threshold value, and the new value is stored in the place of the detected minimum distance.

The sensor thus determined is then granted the priority status and the sensing cycle is adapted so as to poll the prioritized sensor more frequently than the non-prioritized sensors.

Figure 6:
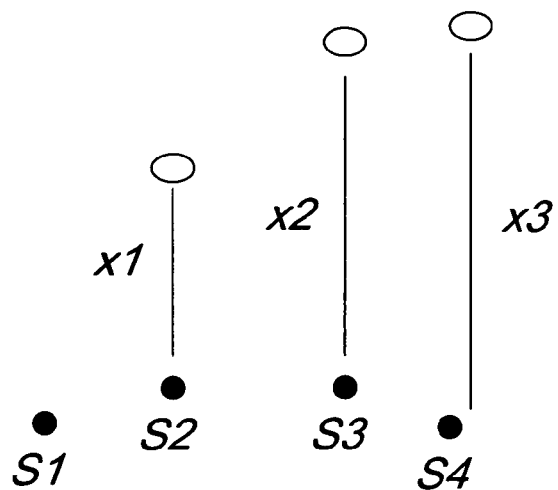
FIG. 6 is a schematic view of a particular scenario in which different sensors detect different distances from one or more obstacles.

For example, it is possible to alternate the polling of the prioritized sensor with a non-prioritized sensor, as shown in FIG. 6.

In the particular example of FIG. 6, the minimum distance x1 is detected by the sensor S2, which is given priority status. The polling cycle according to this particular implementation is therefore S2, S3; S2, S4; S2, S1; S2, S3, and so forth.

If, during successive polling cycles, at least one of the other distances decreases to a value that is lower than the sum of the minimum distance value and the priority threshold value, the corresponding sensor 2 also is given priority status and the obstacle detection sequence is adapted so as to poll all the prioritized sensors more frequently than the non-prioritized sensors.

Again with reference to the example of FIG. 6, if the distance x2 decreases below the sum of the minimum distance value and the priority threshold value, then S3 also obtains priority status.

One polling that is possible in this case may alternate a non-prioritized sensor with the sequence of prioritized sensors, starting from the sensor that corresponds to the minimum detected distance. The polling sequence in this case would be S2, S3, S4; S2, S3, S1; S2; S3; S4, and so forth.

In an alternative embodiment, it might also be possible to exclude from the polling, for a preset number of cycles, the sensors that initially have detected no signal. In this manner, the number of sensors activated at each cycle is reduced, thus reducing the time between two successive pollings of the sensors that detect an obstacle.

It has thus been shown that the described method and system achieve the proposed aim and objects. In particular, it has been found that the system thus conceived allows to overcome the limitations of the background art, since the module for eliminating the echo signals detected in succession fewer times than a preset threshold ensures that warning signals are not generated in case of noise sensings, allowing the system to be much more precise in differentiating actual obstacles from incorrect signals.

Further, the combination of the three modules for the parametric evaluation of the detected signals allows the system to be more flexible in sensings and at the same time more precise.

Moreover, it has been found that the method can be implemented by connecting all the sensors to a single bus and optionally integrating the control unit in another device linked to the CAN network provided in cars. This system allows to reduce the number of electronic devices that are present in the car, offering space saving advantages, a consequent reduction of the production costs of said vehicle, and a reduction of power consumption in operation.

Further, the fact that parametric evaluation occurs within the sensors and is not centralized in the control unit allows the system to be much faster during the evaluation step.

Clearly, numerous modifications are evident and can be performed promptly by the person skilled in the art without abandoning the scope of the protection of the appended claims. For example, it is obvious for the person skilled in the art that the switch of the sensor can be provided in any manner, for example by means of any type of transistor.

Likewise, it is evident to the person skilled in the art that the sensor can operate on one or more parameters, such as the time window, radiated power, threshold values and number of repetitions, simultaneously in order to optimize the sensitivity of the sensors.

Therefore, the scope of the protection of the claims must not be limited by the illustrations or by the preferred embodiments described by way of example, but rather the claims must comprise all the characteristics of patentable novelty that reside within the present invention, including all the characteristics that would be treated as equivalent by the person skilled in the art.

The disclosures in Italian Patent Application No. MO2004A000244 from which this application claims priority are incorporated herein by reference.

What is claimed is:

1. An obstacle detection method, comprising the steps of:
   a) for each sensor that belongs to an activation cycle, determining a power to be radiated, emitting corresponding ultrasound signals, and receiving echo signals reflected by at least one obstacle;
   b) depending on the echo signals received, determining distances of corresponding sensors from the obstacle and amplifying the received echo signals according to corresponding distances;
   c) selecting threshold values with which signals amplified according to said distances determined by b) are to be compared;
   d) determining, at each sensor cycle, a number of times for which signals that exceed a respective selected threshold value are repeated, and, if said number is higher than a preset value, generating a warning signal;
   e) determining an order of priority of the sensors according to the distances determined in step b);
   f) determining an activation sequence of the sensors according to the order priority determined in step e);
   g) adapting a sensing cycle of the sensors according to an activation sequence determined in step f);
   wherein the sending cycle adapted in step g) excludes, for a preset number of cycles that is greater than zero, sensors that in step a) have not received an echo signal; and
   wherein said step e) of determining the order of priority comprises the steps of:
   - associating with each sensor a value of the distance from the obstacle detected by the sensor;
   - determining a value that corresponds to a mininum detected distance and replacing said determined value with a value equal to a sum of said minimum distance value and of a priority threshold value; and
   - assigning to the sensor that detected said minimum distance a priority status.

2. The obstacle detection method of claim 1, wherein said step e) for determining the order of priority further comprises the steps that consist in:
   - at each sensing cycle, determining whether at least one of the detected distances is shorter than the sum of the minimum distance value and the priority threshold value; and
   - assigning to the sensor that detected said shorter distance a priority status in addition to sensors that already have a priority status.

3. The obstacle detection method of claim 2, wherein the sensing cycle adapted in step g) provides for the more frequent activation of the sensors having a priority status with respect to the sensors that do not have a priority status.

* * * * *